United States Patent [19]
Nakane

[11] Patent Number: 4,748,607
[45] Date of Patent: May 31, 1988

[54] TRACK ACCESSING SYSTEM USING AN INTEGRATED VELOCITY SIGNAL

[75] Inventor: Hiroshi Nakane, Yokohama, Japan

[73] Assignee: Kabushiki Kaisha Toshiba, Kawasaki, Japan

[21] Appl. No.: 883,727

[22] Filed: Jul. 9, 1986

[30] Foreign Application Priority Data

Jul. 11, 1985 [JP] Japan .............................. 60-153060

[51] Int. Cl.⁴ ..................... G11B 21/08; G11B 21/10; G11B 7/095
[52] U.S. Cl. ...................................... 369/32; 369/44; 360/77; 360/78; 318/561; 318/616
[58] Field of Search ................. 369/32, 33, 41, 43–46; 360/77, 78; 358/342, 907; 318/561, 594, 592, 593, 596, 576, 615–617, 601, 603

[56] References Cited

U.S. PATENT DOCUMENTS

| | | | |
|---|---|---|---|
| 3,721,882 | 3/1973 | Helms | 318/594 |
| 4,006,394 | 2/1977 | Cuda et al. | 360/78 |
| 4,099,112 | 7/1978 | Klinger | 318/561 |
| 4,168,457 | 9/1979 | Rose | 318/561 |
| 4,285,015 | 8/1981 | Rose et al. | 360/78 |
| 4,381,526 | 4/1983 | McLaughlin et al. | 360/78 |
| 4,575,776 | 3/1986 | Stephens et al. | 360/78 |
| 4,607,358 | 8/1986 | Maeda et al. | 369/44 |
| 4,623,943 | 11/1986 | Osada et al. | 360/78 |

FOREIGN PATENT DOCUMENTS

| | | | |
|---|---|---|---|
| 58-141472 | 8/1983 | Japan | 360/78 |
| 58-137169 | 8/1983 | Japan | 360/78 |

Primary Examiner—Raymond F. Cardillo
Assistant Examiner—Steven R. Garland
Attorney, Agent, or Firm—Cushman, Darby & Cushman

[57] ABSTRACT

A record disc reproducing apparatus, which can be used for searching a desired track location rapidly, includes a pick-up device for reading data from the disc and movable in a radial direction with respect to the disc. A velocity detector detects a moving velocity of the pick-up device and produces a velocity signal corresponding to the moving velocity. An integrator integrates the velocity signal. A distance that the pick-up device should be moved is calculated according to addresses of a track presently scanned by the pick-up device and a track to be searched. A generator supplies a distance data corresponding to the distance calculated. A comparator compares the integrated velocity signal with the distance data. The pick-up device is stopped when the comparator produces an output signal.

12 Claims, 4 Drawing Sheets

TRACK ACCESSING SYSTEM USING AN INTEGRATED VELOCITY SIGNAL

BACKGROUND OF THE INVENTION

1. Field of the Invention

This invention relates generally to information reproducing systems capable of accessing a desired data or information record track on a disc-shape information carrier, and more particularly, to track jump servo systems for disc players having servos for positioning a transducer means rapidly and accurately to a desired record track location on a disc surface.

2. Background of the Invention

Digital record discs for recording information signals such as digitized audio signals, video or image signals have been quite common as well as record disc reproducing apparatus for reproducing the recorded information data. Further, some digital record discs, e.g., so-called CDs (Compact Discs) have recently become used as ROM (Read Only Memory) devices for computers, called CD-ROMs. On such a digital record disc, digital data intended for high density recording are recorded in the form of a spiral bit string on one side thereof and reproduced through reading the bit string by means of transducer means such as an optical pick-up device using laser beams. The optical pick-up device of the record disc reproducing apparatus follows the bit string by means of a tracking control system. CD players or video disc players are further used to process the read-out signal in a predetermined manner so as to convert the signal into a replica of the original analog form signal which was recorded, i.e., an audio or video signal as an output.

As is well known, address information may also be recorded on the record disc which may be detected for search and track jump operations so that reproduction at a desired track location can be easily and quickly achieved. In particular, a selected address corresponding to the desired track location is preset, and the pick-up device is rapidly moved across or transverse to the track until the desired track corresponding to the selected address is reached. During such searching, a distance or a number of tracks that the pick-up device should jump or traverse is calculated by, for example, a computer in accordance with the address of the track at which the pick-up device is presently located and the address of the desired track. Then a fixed voltage signal is supplied to a pick-up drive motor to move the pick-up device radially across the disc surface. During the search operation, tracks that the pick-up device crosses are counted one by one. When the counted number of tracks jumped coincides with the desired number of tracks jumped, as calculated, the pick-up device is stopped and track servo control recommences. Tracks are counted, generally, by counting level changes or pulses in a tracking error signal which is responsive to whether the pick-up device is in or out of a track. In other words, the tracking error signal indicates deviations of the pick-up device from the center of the record track.

However, conventional track jump servo control systems are unable to increase the moving speed of the pick-up device over a predetermined value. As is well known, the information tracks are actually strings of pits to which the pick-up device can respond respectively arranged in a line. Obviously, the pits are separated from each other with spaces to which the pick-up device fails to respond. Radial movement of the pick-up device is carried out with the disc in revolution. Therefore, when the pick-up device is moved too fast radially relative to the disc surface, occasionally the pickup device will pass through a track without crossing any pit in the respective pit string. No pulse is produced in the tracking error signal, despite the pick-up device crossing a track, so that an error is introduced in the track count. Accordingly, this causes the pick-up device to be erroneously placed on a track different from the desired track.

In the past, the moving speed of the pickup device in the search operation had been limited to a speed which ensures that the pick-up device will cross a pit in every track. The maximum speed is approximately the speed at which a frequency of the level changes or the pulses of the tracking error signal is close to a frequency of pits during the revolution of the disc. Such a limitation of the moving speed of the pick-up device becomes an impediment for shortening the access time to a desired track location. Especially, the limitation is particularly serious in the recently developed CD-ROMs for which a shortening of the access time has been eagerly demanded.

In a short distance search operation of only a few tracks, the pick-up device can jump to the desired track relatively accurately. In a long distance search operation, however, to a track located dozens of tracks away from the track at which the pick-up device is presently located, the pick-up device does not become accurately placed on the desired track for a long time. During a long distance search operation, the actual distance that the pick-up device has moved is apt to differ from the desired distance calculated by the computer. As the distance the pick-up device should jump or traverse becomes longer, a track that the pick-up device has been placed at the end of the jump may differ more from the desired track due to mechanical loss or non-uniformity in the mechanism for transferring the pick-up device, inertia of the pick-up device, temperature conditions and the like.

Therefore, the search operation includes repeated track jumps so that the pick-up device gradually approaches the desired track location. After every track jump in the search operation, the track address is checked to determine whether a track where the pick-up device has been placed after the track jump coincides with the desired track or not.

As a result, it is difficult to ensure that the pick-up device jumps over or traverses rapidly and accurately the record tracks to a desired track location on the disc.

SUMMARY OF THE INVENTION

Accordingly, it is an object of the present invention to provide an information reproducing system capable of rapidly and accurately accessing a desired data or information record track on a discshape information carrier.

It is another object of the present invention to provide a track jump servo system for disc players having servos for positioning a transducer means rapidly and accurately to a desired record track location on a disc surface.

It is still another object of the present invention to provide a track jump servo system for disc players which is able to avoid the above described difficulties encountered with the prior art.

These and other objects of the present invention are achieved in a record disc reproducing apparatus in which a velocity detector detects the radial velocity of a pick-up device during a search and produces a velocity signal corresponding to the radial velocity. An integrator integrates the velocity signal. A calculator calculates a desired distance that the pick-up device should be moved according to the address of a track presently scanned by the pick-up device and a track to be searched. A generator supplies distance data corresponding to the desired distance calculated in the distance calculated means. Finally, a comparator compares the integrated velocity signal with the distance data. The pick-up device is stopped when the comparator produces an output signal.

BRIEF DESCRIPTION OF THE DRAWINGS

Additional objects, advantages, and features of the present invention will further become apparent to persons skilled in the art from a study of the following description and of the accompanying drawings, in which.

DESCRIPTION OF THE PREFERRED EMBODIMENTS

Figure 1:
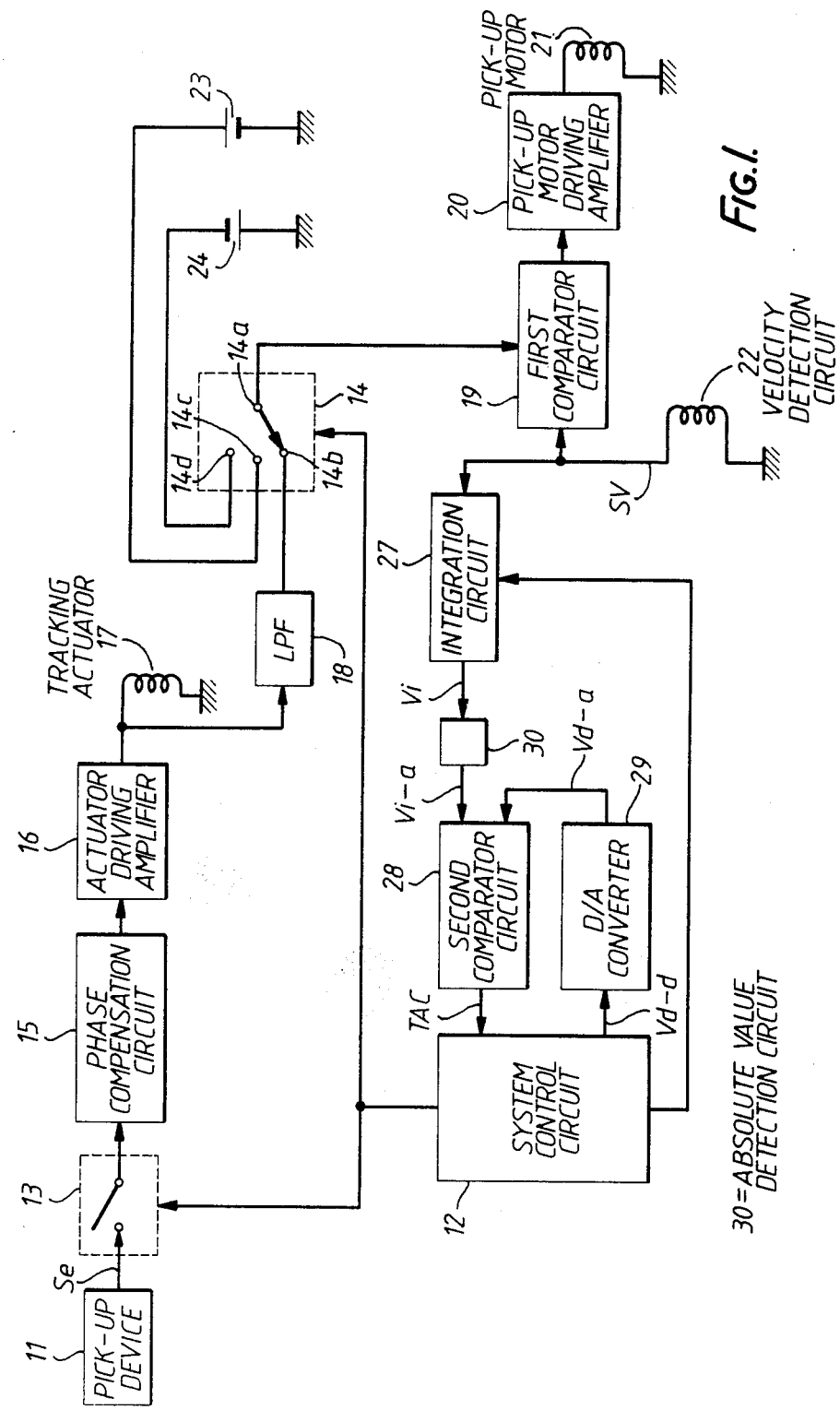
FIG. 1 is a block diagram of a first embodiment of the present invention.

The present invention will now be described in detail with reference to FIGS. 1 to 4. Throughout the drawings, like reference numerals or letters are used to designate like or equivalent elements.

Referring first to FIG. 1, description will be made of a block diagram of a first embodiment of the track jump servo system for disc players according to the present invention.

In FIG. 1, a tracking error signal Se obtained in response to deviation of pick-up device 11 from the center of the record track then being scanned is supplied to a tracking actuator 17 (presented as a coil symbol in the drawing) through a first switch 13, a phase compensation circuit 15 and an actuator drive amplifier 16. Tracking actuator 17 is provided for deflecting a light beam of the pick-up device in the radial direction with respect to the disc surface. Tracking error signal Se controls the deflection of the light beam caused by tracking actuator 17 so that a liqht spot formed on the disc by the light beam of pick-up device 11 may be guided along a selected track on the disc.

Tracking error signal Se from the output terminal of amplifier 16 is applied to a low pass filter (LPF) 18. An output of LPF 18, i.e., a DC component of the tracking error signal Se is supplied to a first fixed contact 14b of a second switch 14. Second and third fixed contacts 14c and 14d of second switch 14 are supplied, respectively, with a positive voltage and a negative voltage from a positive voltage source 23 and a negative voltage source 24, respectively. Switch 14 has a movable contact 14a which is coupled to first fixed contact 14b in a reproduction mode which will be described later.

The DC component of tracking error signal Se passing through second switch 14 is provided to an input of first comparator circuit 19 and compared therein with a velocity signal which will be described later. An output of first comparator circuit 19, i.e., a difference between the DC component of tracking error signal Se and the velocity signal is applied to a pick-up motor 21 (represented by a coil in the drawing) through a pick-up motor drive amplifier 20. Pick-up motor 21 is a type of conventional linear motor which rotates at a velocity corresponding to a supplied drive voltage. This type of linear motor generally has a velocity detection means for servo-controlling its movement. Pick-up motor 21 moves pick-up device 11 steadily in response to the difference signal outputted from first comparator 19 in the radial direction of the disc, as reproduction from the disc by the pick-up devide occurs. A moving velocity of pick-up device 11 is monitored by a velocity detection circuit 22 (represented by a coil in the drawing) for stabilizing the movement of the linear motor 21 and circuit 22 produces velocity signal Sv in response to the moving velocity of the pick-up device. Accordingly, the track by track transfer of the pick-up device may be advanced steadily in the reproduction mode operation. The degree of error, indicated by the signal from filter 18, is compared with the moving velocity of pick-up device 11 so that the controlled velocity of pick-up device 11 increases or decreases with the increase or decrease in error, respectively.

Movable contact 14a of second switch 14 is coupled to second fixed contact 14c or third fixed contact 14d in a search mode, and the positive voltage or the negative voltage from positive voltage source 23 or negative voltage source 24 is applied to the one input of comparator circuit 19 instead of the DC component of tracking error signal Se. The positive voltage and the negative voltage each have a large absolute-value as compared to the DC component of tracking error signal Se. Therefore, pick-up motor 21 transfers the pick-up device at a very fast velocity.

The velocity signal outputted from velocity detection circuit 22 is further applied to an input of a second comparator circuit 28 through both an integration circuit 27 and an absolute-value conversion circuit 30. Another input of second comparator circuit 28 is supplied with a reference signal which will be described later. Therefore, the absolute value of the integrated velocity signal is compared with the reference signal in comparator circuit 28. A comparison output from comparator circuit 28 is applied to a system control circuit 12.

System control circuit 12 commands switch 13 to be ON or OFF when a reproduction mode or an information search mode is requested, respectively. In the information search mode for accessing a desired record track location, system control circuit 12 calculates a distance between a record track then being scanned and the desired record track, in other words, a number of record tracks that the pick-up device should jump over or traverse. Then system control circuit 12 produces digital data corresponding to the distance or the number of record tracks.

In the search mode operation, system control circuit 12 also determines a direction that the pick-up device should jump over or traverse and then commands switch 14 to select second fixed contact 14c or third fixed contact 14d in response to the direction information. In the embodiment, it is assumed that second fixed contact 14c is selected for the coupling to movable contact 14a when the pick-up device should move in the outward direction of the record disc. Third fixed contact 14d is selected for the coupling to movable contact 14a when the pick-up device should move in the inward direction of the record disc.

The digital distance data produced from system control circuit 12 is applied to a digital-to-analog (D/A) converter 29. D/A converter 29 converts the digital distance data into an analog distance data, i.e., the aforementioned reference signal. Comparator circuit 28 compares the absolute value of the integrated velocity signal with the analog distance data and produces a high (H) level signal when the voltage from absolute value circuit 30 reaches the reference voltage from D/A converter 29. In response to the H level signal supplied from comparator circuit 28, system control circuit 12 commands not only switch 13 to be ON, but also switch 14 to select first fixed contact 14b. Then the operation mode of the record disc reproduction apparatus changes from the search mode to the tracking servo mode for data reproduction. After the change to the reproduction mode, the pick-up device is placed on the desired track or a track very close to the desired track. Therefore, the pick-up device may then be moved to the desired track by the conventional track by track transfer system.

Comparator circuit 28 produces a low (L) level signal when the difference between the signals are out of the prescribed narrow voltage range. While system control circuit 12 receives the low level signal, it then commands not only switch 3 to be OFF, but also maintains switch 14 in the second or third fixed contact 14c or 14d position. Therefore, the search mode operation is maintained.

System control circuit 12 also resets the output of integration circuit 27, i.e., the integrated velocity signal, with a reset signal every time the search mode operation is requested.

In the above embodiment, the velocity signal detected in velocity detection circuit 22 during the search mode operation is gradually integrated in integration circuit 27 as the transfer of pick-up device 11 advances, causing the integrated voltage to increase as pick-up device 11 advances. The integrated voltage of the velocity signal accurately corresponds to a distance that pick-up device 11 has been transferred. Velocity detection circuit 22 produces a positive or a negative velocity signal in response to the outward direction jump or the inward direction jump of the pick-up device 11. Therefore, integration circuit 27 produces a positive or a negative integration signal in response to the outward direction jump or the inward direction jump of pick-up device 11. However, the integration signals from integration circuit 27 are converted to their absolute-value in absolute-value conversion circuit 30. Therefore, comparator circuit 28 is able to respond to both transfer directions of pick-up device 11 without any change.

As described above, the pick-up device is moved radially in the outward or inward direction of the disc surface according to the voltage of positive voltage source 23 or negative voltage source 24 until the difference between the integrated voltage of the velocity signal and the analog distance signal falls into the prescribed narrow voltage range. As may be easily understood from this embodiment, the search operation for any desired track is performed without counting the corresponding track pulses in the tracking error signal or the like. Therefore, the moving velocity of pick-up device 11 for the track jump may be increased freely. Further, the time at which pickup device 11 should be stopped, i.e., the time the operation mode is changed from the search mode to the reproduction mode, is accurately determined by the integration of the velocity signal.

Figure 2:
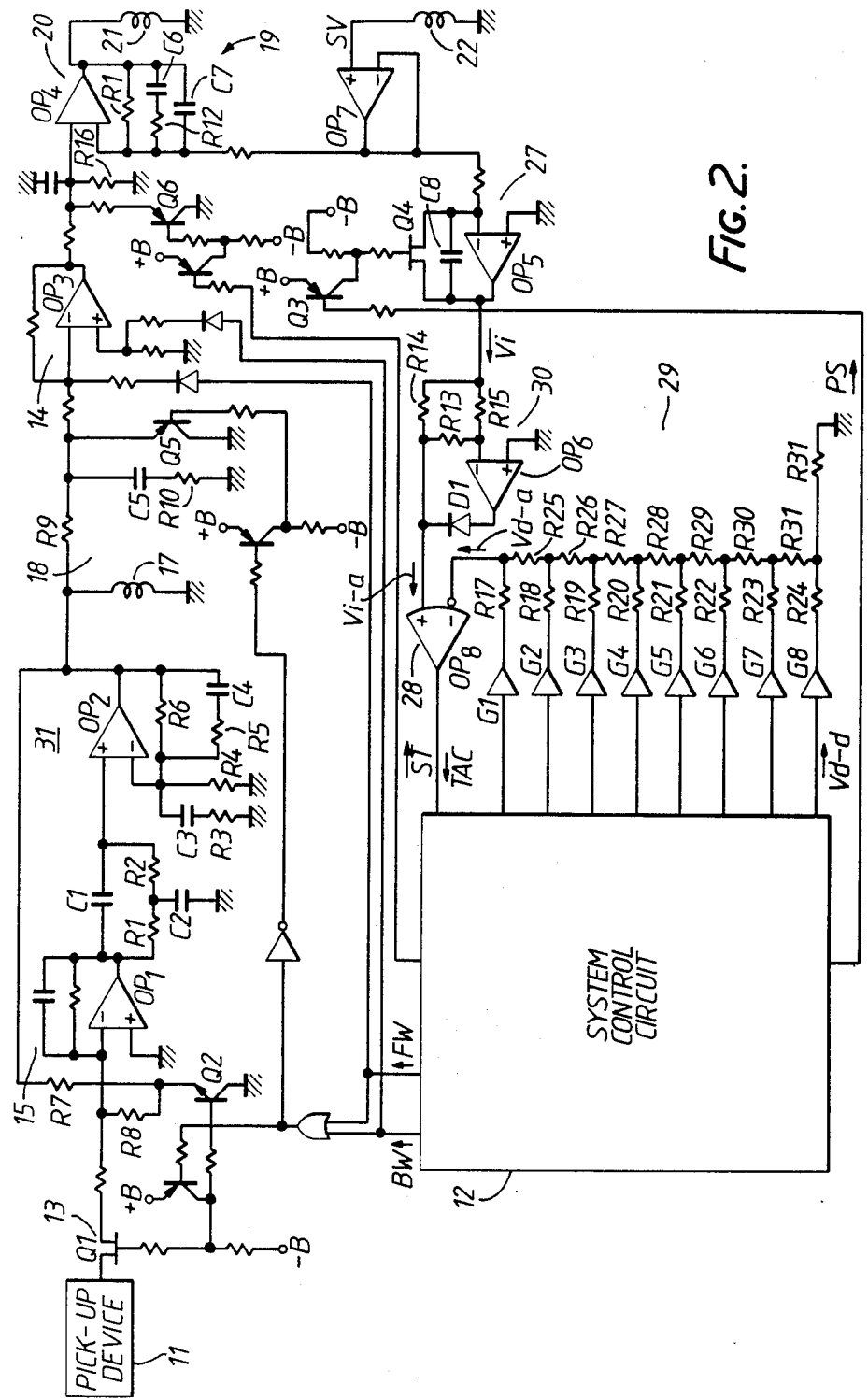
FIG. 2 is a practical circuit arrangement for the embodiment of the present invention.

FIG. 2 shows a practical circuit arrangement embodying the above embodiment of the record disc reproducing apparatus according to the present invention as shown in FIG. 1. An operation of the record disc reproducing apparatus shown in FIG. 2 will be described hereinafter in using FIG. 3. An explanation of its circuit construction will be also made properly in the description.

In FIG. 2, system control circuit 12 produces a reset signal PS, either of forward and backward direction signals FW and BW, an 8-bit digital data and search mode stop signal ST. Reset signal PS is supplied to integration circuit 27 which will be described later for resetting it at the timing that a search mode operation is requested. Direction signals FW and BW are supplied to an operation amplifier OP3 which will be also described later for commanding an outward track jump and an inward track jump of the pick-up device, respectively. Search mode stop signal ST is supplied to a transistor Q6 which will be also described later.

In the reproduction mode, a tracking error signal Se from pick-up device 11 is supplied to an FET (Field Effect Transistor) Q1 which operates as first switch 13 in FIG. 1 (the same in below description). FET Q1 is connected at its gate to system control circuit 12 for receiving either of direction signals FW and BW through an OR gate. However, both direction signals FW and BW are kept in L level in the reproduction mode so that FET Q1 is ON. Therefore, tracking error signal Se passes through first switch 13 and then it is supplied to tracking actuator 17 through phase compensation circuit 15 which comprises an operation amplifier OP1, resistor R1, R2 and capacitors C1, C2 and integration compensating circuit 31 which comprises an operation amplifiers OP2, resistor R3, R4, R5, R6 and capacitors C3, C4. An output terminal of integration compensating circuit 31, i.e., an output terminal of operation amplifier OP2 is connected to an input terminal of phase compensation circuit 15, i.e., an input terminal of operation amplifier OP1 through resistors R7 and R8, in series. The connection node of resistors R7 and R8 is grounded through a transistor Q2 which is connected at its base to system control circuit 12 for receiving either of direction signals FW and BW also through the OR gate. As both direction signals FW and BW are kept in L level in the reproduction mode, transistor Q2 is OFF so that an output signal of integration compensating circuit 31 is fed back to phase compensation circuit 15. Therefore, offset components of output voltages of both operation amplifiers OP1 and OP2 are compensated with each other.

The output voltage of integration compensating circuit 31 is supplied not only to tracking actuator 17 but also to pick-up motor 21 through LPF 18 which comprises resistors R9, R10 and a capacitor C5, operation amplifier OP3 which operates comparably to second switch 14 and pick-up motor drive amplifier 20 which comprises an operation amplifier OP4, resistors R11, R12 and capacitors C6, C7. An output terminal of LPF 18 is grounded through a transistor Q5 which is connected at its base to system control circuit 12 for receiving either of direction signals FW and BW through the OR gate, an inverter etc. Transistor Q5 operates comparably to first fixed contact 14b of second switch 14.

When a search mode for accessing any desired track location of a disc is requested, system control circuit 12 first changes reset signal PS to a L level. Reset signal PS is supplied to the gate of an FET Q4 which is connected to integration circuit 27. Integration circuit 27 comprises an operation amplifier OP5 and a capacitor C8 connected between an inverted input and an output of operation amplifier OP5. FET Q4 is connected at its source drain path in parallel to capacitor C8. FET Q4 therefore turns ON in response to L level reset signal PS so that it resets integration circuit 27 by discharging capacitor C8 at the time that the search mode operation starts. Simultaneously, an output of absolute-value conversion circuit 30 which comprises an operation amplifier OP6, resistors R13 through R15 and a diode D1 becomes a 0 level.

After a prescribed time has elapsed, system control circuit 12 returns reset signal PS to a H level and also produces either of direction signals FW and BW. Now let us assume here that a track located outwardly from the track presently scanned is addressed for the search so that forward direction signal FW is produced. Forward direction signal FW changes FET Q1 to an OFF state but also transistor Q5 to an ON state so that a tracking servo operation is stopped and a voltage leaving tracking actuator 17 is prevented from flowing into pick-up motor 21.

Operation amplifier OP3 produces a negative constant voltage signal in response to forward direction signal FW applied to its inverted input terminal and supplies it to pick-up motor 21 through pick-up motor drive amplifier 20. Therefore, pick-up motor 21 transfers the pick-up device outwardly, relative to the disc surface.

A moving velocity of the pick-up device is detected by velocity detection circuit 22. An output of velocity detection circuit 22, i.e., a velocity signal Sv is supplied to integration circuit 27 through an operation amplifier OP7 and integrated therein. Therefore, an output of integration circuit 27 takes a voltage Vi corresponding to a distance that the pick-up device has moved. Integration voltage Vi is supplied to absolute-value conversion circuit 30 and converted to its absolute-value Vi-a therein. Absolute-value Vi-a of integration voltage Vi is supplied to the non-inverted input terminal of comparator circuit 28 and compared with an analog distance data Vd-a supplied from D/A converter 29 which comprises amplifiers G1 through G8 and resistors R17 through R32. D/A converter 29 is connected between system control circuit 12 and the inverted input terminal of comparator circuit 28 for converting the above-mentioned digital distance data Vd-d to the corresponding analog distance data Vd-a. D/A converter 29 produces a control signal TAC of a H level when a difference between absolute-value Vi-a of integration voltage Vi and analog distance data Vd-a decreases lower than a prescribed low voltage close to 0 volt.

System control circuit 12 quits the production of forward direction signal FW in response to a H level control signal TAC supplied from comparator circuit 28. Therefore, conductive states of FET Q1 and transistors Q5, Q6 are changed to ON and OFF states respectively so that the circuit arranged resumes the reproduction mode.

Pick-up device 11 will overshoot the object track due to its inertia after the search operation has been stopped. The overshoot is however limited within a few tracks. In this case, pick-up device 11 is returned to the object track using the conventional track-by-track transfer method by kicking tracking actuator 17.

The above description was made for the forward track jump search operation. When a track located inwardly from the track presently scanned is addressed for the search so that backward direction signal BW is produced, it also changes FET Q1 and transistor Q5 to OFF and ON states, respectively, as in the case of forward direction signal FW. Therefore a tracking servo operation is stopped and a voltage leaving tracking actuator 17 is prevented for flowing into pick-up motor 21.

Operation amplifier OP3 however produces a positive constant voltage signal in response to backward direction signal BW applied to its noninverted input terminal differently to the case of forward direction signal FW. Operation amplifier OP3 supplies the positive constant voltage signal to pick-up motor 21 through pick-up motor drive amplifier 20. Therefore, pick-up motor 21 transfers the pick-up device inwardly, relative to the disc surface.

An output of velocity detection circuit 22, i.e., a velocity signal Sv and its integration voltage Vi each takes a polarity different from the polarity of velocity signal Sv and its integration voltage Vi in the case of forward direction signal FW. Integration voltage Vi of velocity signal Sv in this case however can be processed in second comparator circuit 28 equally to the other polarity in the case of forward direction signal FW, since positive and negative polarity velocity signals are converted to the same absolute-value signal in absolute-value conversion circuit 30. That is, second comparator circuit 28 can cope with the search operation in any direction without any circuit changes.

Figure 3:
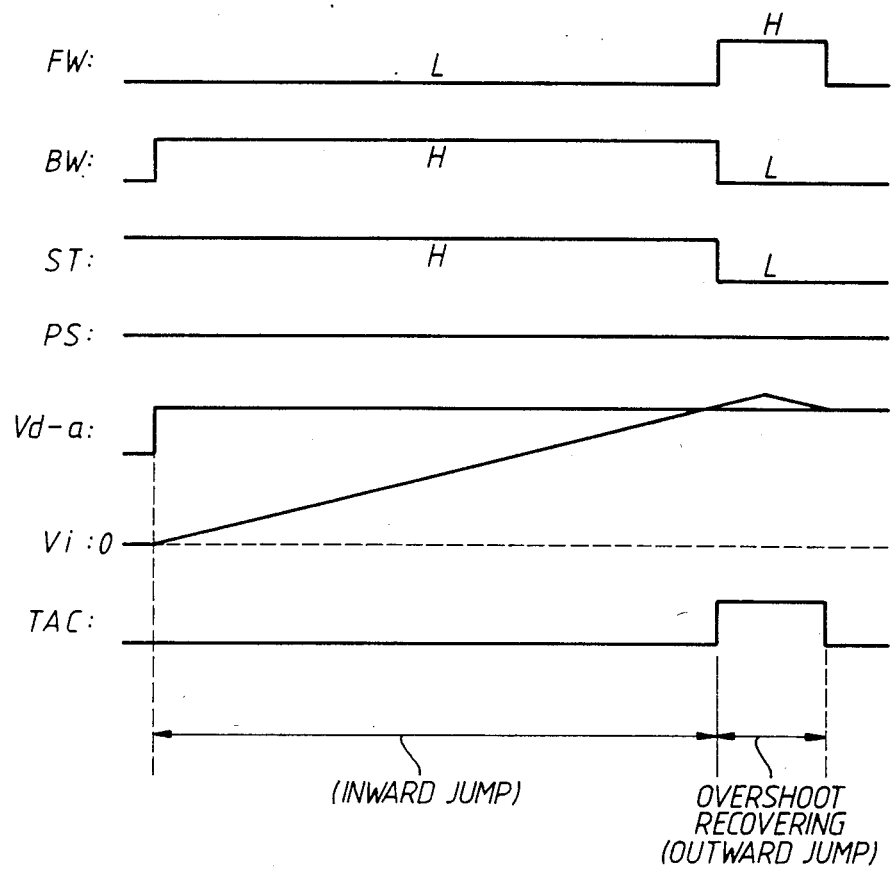
FIG. 3 is a timing chart used to explain the search operation of an alternative embodiment to that shown in FIG. 2.

Referring now to FIG. 3, a modification of the above embodiment will be explained. The modification has the same circuit arrangement as the above embodiment shown in FIGS. 1 and 2 except that system control circuit 12 performs a modified process. Therefore, the description of its operation will be eliminated for the same or identical portions to those of the above embodiment. The description will be made for the case of the inward track jump search operation.

When absolute value integration signal Vi-a has become a prescribed value close to digital distance data Vd-a supplied from D/A converter 29, second comparator circuit 28 produces control signal TAC. System control circuit 12 then changes backward direction signal BW to a L level. So that, the positive voltage supplied from operation amplifier OP3 to pick-up motor 21 is stopped. However, pick-up device 11 overshoots the object track due to its inertia or other reasons. System control circuit 12 produces forward direction signal FW of a H level after the level change of backward direction signal BW. Therefore, operation amplifier OP3 supplies pick-up motor 21 with a negative voltage. Therefore, the inward overshooting movement of pick-up device 11 is damped and then driven in the reverse direction, i.e., in the outward direction. Further system control circuit 12 changes stop signal ST to L level. Transistor Q6 then becomes ON so that a voltage on a resistor R16 connected between the input terminal of operation amplifier OP4 and the ground terminal is decreased lower than the output voltage of operation amplifier OP3. This lowers the velocity of the pick-up device in the outward direction track jump for recovering from the overshoot. Then the influence of the inertia of pick-up device 11 during the overshoot recovery becomes almost neglectable.

Figure 4:
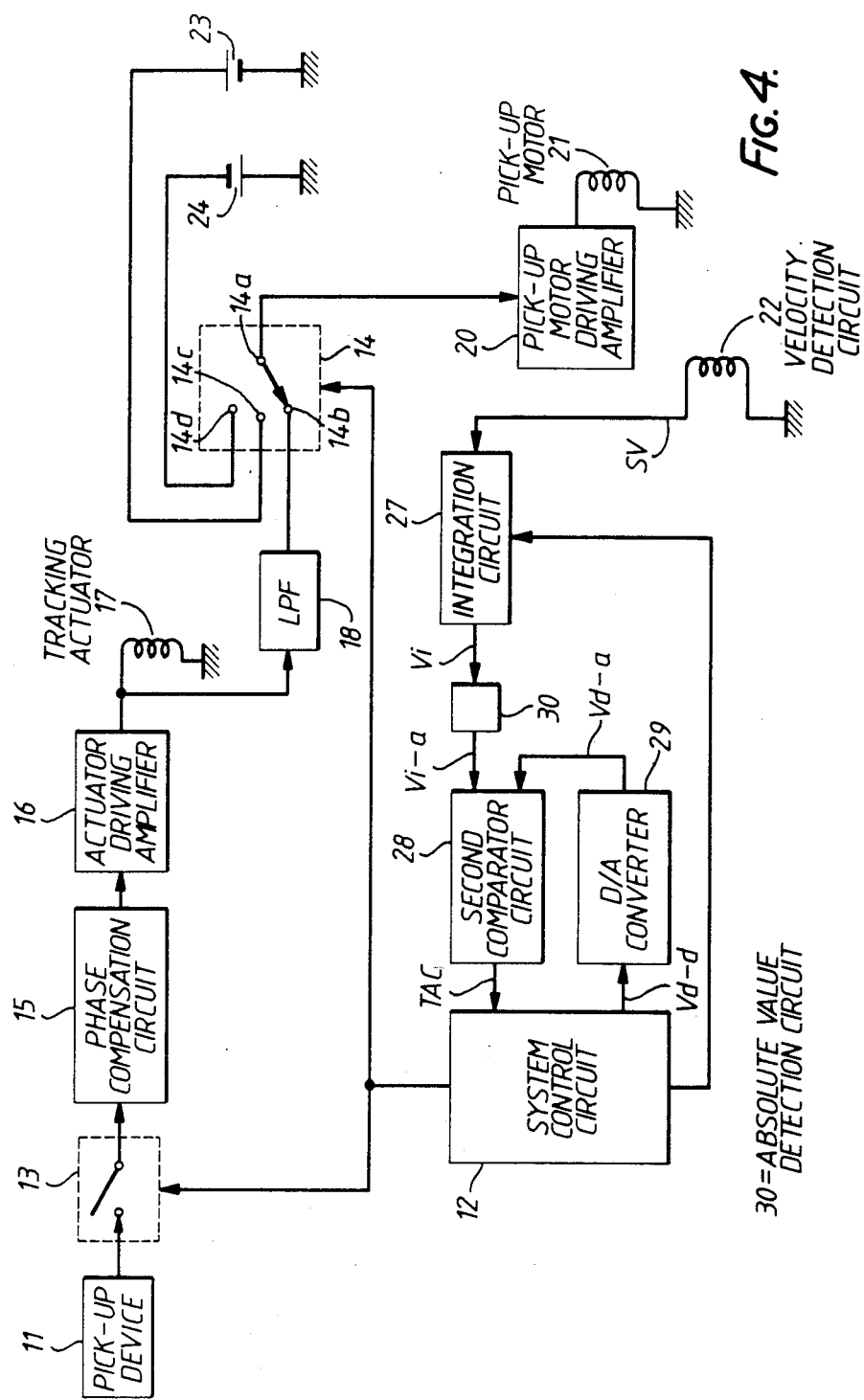
FIG. 4 is a block diagram of a second embodiment of the present invention.

Referring now to FIG. 4, description will be made for a block diagram of a second embodiment of the track jump servo system for disc players according to the present invention.

The second embodiment shown in FIG. 4 has the same construction with the first embodiment shown in FIG. 1 in the block diagram except that velocity detection circuit 22 is provided for the exclusive use, during the search mode operation, to provide a velocity signal to be integrated by integrator 27. Therefore, pick-up motor 21 may be either of the linear type motor or of the revolving type motor. In this embodiment, velocity signal Sv detected in velocity detection circuit 22 is supplied to integration circuit 27 only. Pick-up motor driving amplifier 20 receives a signal directly from switch 14.

Although only a few embodiments of this invention have been described in detail above, those skilled in the art will appreciate that many modifications are possible in the preferred embodiments without departing from the novel teachings and advantages of this invention. Accordingly, all such modifications are intended to be included in this invention as defined by the following claims.

What ls claimed is:

1. A record disc reproducing apparatus comprising:
   means, movable in a radial direction with respect to said disc, for reading data from said disc;
   means for driving said reading means in said radial direction in proportion to a driving level applied thereto;
   means for producing a velocity signal corresponding to a moving velocity of said reading means in said radial direction;
   means for integrating said velocity signal;
   means for generating distance data related to a desired distance of radial movement of said reading means;
   means for comparing said integrated velocity signal and said distance data; and
   means for energizing said driving means to drive said reading means at a velocity independent of said integrated velocity signal until said integrated velocity signal and said distance data assume a predetermined relationship, and energizing said driving means at a level to drive said reading means a different velocity after said integrated velocity signal and said distance data assume said predetermined relationship.

2. Apparatus as in claim 1 wherein said energizing means includes means for reversing a direction said driving means drives said reading means from a time beginning when said integrated velocity signal and said distance data assume a first predetermined relationship, and ending at a time when said integrated velocity signal and said distance data assume a second predetermined relationship.

3. Apparatus as in claim 2 wherein said driving means includes means, responsive to said reversing means, for driving said reading means at reduced velocity in said reverse direction.

4. Apparatus as in claim 1 wherein said energizing means comprises a switch having a constant voltage level supplied to one contact, and another contact coupled to said driving means to supply said driving level thereto, said switch remaining closed to maintain said constant voltage level to said driving means unitil said integrated velocity signal and said distance data assume said predetermined relationship and opening thereafter.

5. Apparatus as in claim 4 wherein said another contact includes a plurality of terminals, one receiving a driving level indicative of a forward driving and another receiving a driving level indicative of a reverse driving.

6. A record disc reproducing apparatus for use in reproducing data stored in tracks on said disc, comprising:
   a pick-up device for reading data from said disc and movable in a radial direction with respect to said disc;
   means for producing a prescribed voltage signal when an operation for searching any desired track on said disc is requested;
   means for radially driving said pick-up device relative to said disc based on said prescribed voltage signal;
   means for detecting a moving velocity of said pick-up device and producing a velocity signal corresponding to the moving velocity;
   means for integrating the velocity signal and producing an integrated velocity signal indicative thereof;
   means for calculating a distance that said pick-up device should be moved, according to addresses of a presently-scanned track on aid disc and a track to be searched on said disc;
   means for supplying a distance data corresponding to the distance calculated in said distance calculating means;
   means for comparing said integrated velocity signal with said distance data; and
   means for maintaining said prescribed voltage signal at a constant level until said comparing means produces an output signal indicative of a prescribed result of said comparing and commanding said prescribed voltage signal to other than said constant level after said comparing means produces said prescribed result.

7. Apparatus as in claim 6 further comprising second means for producing another prescribed voltage signal to drive said pick-up device in an opposite direction than said prescribed voltage signal and means for causing said another prescribe voltage signal to energize said driving means from the time said comparing means produces said output signal until said comparing means produces nother output signal.

8. Apparatus as in claim 7, wherein said driving means is responsive to said another prescribed voltage of said second producing means, said driving means including means for driving said pick-up device to move more slowly when receiving said another prescribed voltage, than it does when receiving said prescribed voltage of said producing means.

9. Apparatus as in claim 6 wherein said detecting means produces a voltage having a polarity indicative of a direction of movement and said integrating means further comprises means for producing a signal having an absolute value of a result of integrating said velocity signal, said signal having an absolute value being output as said integrated velocity signal.

10. Apparatus as in claim 6 wherein said pick-up device includes means for producing an error tracking signal and said apparatus further comprises:
   a low pass filter responsive to said error tracking signal to produce a filtered signal; and switch means coupled to said filtered signal and said prescribed voltage signal, for outputting said prescribed voltage signal during said operation for searching and for outputting said filtered signal during an operation for servo-control tracking, said driving means being responsive to said output of said switch means.

11. Apparatus as in claim 10 further comprising a comparator having a first input connected to said detecting means, a second input connected to said switch means and an output connected to said driving means.

12. Apparatus as in claim 6 wherein said producing means comprises a switch having a constant voltage level supplied to one contact, and another contact coupled to said maintaining means to supply said prescribed level thereto, said switch remaining closed to maintain said constant level to said maintaing means until said integrated velocity signal and said distance data assume said predetermined relationship and opening thereafter.

* * * * *